(12) United States Patent
Baeck

(10) Patent No.: US 11,048,767 B2
(45) Date of Patent: Jun. 29, 2021

(54) COMBINATION CONTENT SEARCH

(71) Applicant: SAP SE, Walldorf (DE)

(72) Inventor: Tanja Baeck, Wiesloch (DE)

(73) Assignee: SAP SE, Walldorf (DE)

( * ) Notice: Subject to any disclaimer, the term of this patent is extended or adjusted under 35 U.S.C. 154(b) by 188 days.

(21) Appl. No.: 16/193,655

(22) Filed: Nov. 16, 2018

(65) Prior Publication Data

US 2020/0159861 A1  May 21, 2020

(51) Int. Cl.
| | |
|---|---|
| *G06F 16/9535* | (2019.01) |
| *G06F 16/93* | (2019.01) |
| *G06F 16/248* | (2019.01) |
| *G06N 20/00* | (2019.01) |
| *H04L 29/06* | (2006.01) |

(52) U.S. Cl.
CPC ........ *G06F 16/9535* (2019.01); *G06F 16/248* (2019.01); *G06F 16/93* (2019.01); *G06N 20/00* (2019.01); *H04L 63/0876* (2013.01)

(58) Field of Classification Search
CPC .... G06F 16/9535; G06F 16/93; G06F 16/248; G06N 20/00; H04L 63/0876; H04L 67/02; H04L 67/327
USPC ....................................................... 707/706
See application file for complete search history.

(56) References Cited

U.S. PATENT DOCUMENTS

| | | | | |
|---|---|---|---|---|
| 7,836,060 | B1 * | 11/2010 | Rennison | G06F 16/334 |
| | | | | 707/749 |
| 8,209,331 | B1 * | 6/2012 | Garg | G06F 16/332 |
| | | | | 707/734 |
| 9,299,030 | B1 * | 3/2016 | Hotchkies | G06N 5/046 |
| 9,665,641 | B1 * | 5/2017 | Zhang | G06F 16/285 |
| 10,019,518 | B2 * | 7/2018 | Chen | G06F 16/951 |
| 10,296,540 | B1 * | 5/2019 | Bhole | G06F 16/51 |
| 10,706,450 | B1 * | 7/2020 | Tavernier | G06Q 30/0625 |
| 10,909,124 | B2 * | 2/2021 | Lim | G06F 16/335 |
| 2002/0103778 | A1 * | 8/2002 | Saxena | H04L 67/2847 |

(Continued)

OTHER PUBLICATIONS

Ding et al., "User Modeling for Personalized Web Search With Self-Organizing Map", Journal of the American Society for Information Science and Technology, vol. 58, Issue 4, 2007, pp. 494-507. (Year: 2007).*

(Continued)

*Primary Examiner* — Phuong Thao Cao
(74) *Attorney, Agent, or Firm* — Fish & Richardson P.C.

(57) ABSTRACT

The present disclosure involves systems, software, and computer implemented methods with facilitating the results of a search request by analyzing content that matches actions words. One example system includes operations to receiving a request via interactions with an interface from a client device, wherein the interface is associated with a repository of content and manages interactions between the client device and the repository of content based on the request from the user. Keywords are identified from the request. The keywords are matched from the request with at least one action from a repository of actions. In response to matching the keywords from the request with the at least one action, content documents are identified from the repository of content associated with the at least one action. The identified content documents are filtered based on the keywords from the request. The filtered content documents are provided to the client device.

18 Claims, 7 Drawing Sheets

(56) References Cited

U.S. PATENT DOCUMENTS

| | | | |
|---|---|---|---|
| 2003/0014368 A1* | 1/2003 | Leurig | G06Q 20/382 |
| | | | 705/64 |
| 2003/0115191 A1* | 6/2003 | Copperman | G06F 16/9038 |
| 2004/0186827 A1* | 9/2004 | Anick | G06F 16/3325 |
| 2007/0136264 A1* | 6/2007 | Tran | G06F 16/9535 |
| 2008/0115207 A1* | 5/2008 | Go | G06F 21/608 |
| | | | 726/17 |
| 2009/0024607 A1* | 1/2009 | Sun | G06F 16/334 |
| 2009/0070126 A1* | 3/2009 | MacDaniel | G06Q 30/08 |
| | | | 705/321 |
| 2009/0077057 A1* | 3/2009 | Ducheneaut | G06Q 30/02 |
| 2010/0306161 A1* | 12/2010 | Chen | G06Q 30/02 |
| | | | 706/52 |
| 2011/0313548 A1* | 12/2011 | Taylor | G06F 16/9024 |
| | | | 700/47 |
| 2012/0320419 A1* | 12/2012 | Ito | H04N 1/32529 |
| | | | 358/1.15 |
| 2013/0144870 A1* | 6/2013 | Gupta | G06F 16/951 |
| | | | 707/726 |
| 2013/0262439 A1* | 10/2013 | Hao | G06F 16/3322 |
| | | | 707/722 |
| 2014/0058954 A1* | 2/2014 | Perlstein | G06Q 50/188 |
| | | | 705/80 |
| 2014/0067703 A1 | 3/2014 | Baeck et al. | |
| 2014/0074920 A1* | 3/2014 | Nowak | G06F 15/16 |
| | | | 709/204 |
| 2014/0092420 A1* | 4/2014 | Fukudome | G06F 3/1288 |
| | | | 358/1.14 |
| 2014/0129465 A1 | 5/2014 | Baeck et al. | |
| 2014/0180945 A1 | 6/2014 | Hoque et al. | |
| 2014/0180947 A1 | 6/2014 | Baeck et al. | |
| 2014/0201198 A1* | 7/2014 | Chen | G06F 16/3326 |
| | | | 707/722 |
| 2014/0324721 A1* | 10/2014 | Rennison | G06Q 50/2057 |
| | | | 705/321 |
| 2014/0372423 A1* | 12/2014 | Majumder | G06F 16/9535 |
| | | | 707/725 |
| 2015/0006564 A1* | 1/2015 | Tomkins | G06F 16/3322 |
| | | | 707/767 |
| 2015/0077793 A1* | 3/2015 | Mori | G06F 3/1288 |
| | | | 358/1.15 |
| 2015/0227633 A1* | 8/2015 | Shapira | G06F 16/338 |
| | | | 707/706 |
| 2015/0371142 A1* | 12/2015 | Jain | G06N 5/048 |
| | | | 706/52 |
| 2015/0378296 A1* | 12/2015 | Kim | H04N 1/4413 |
| | | | 399/80 |
| 2016/0055263 A1* | 2/2016 | Haine | G06F 9/453 |
| | | | 707/769 |
| 2016/0274840 A1* | 9/2016 | Bannai | G06F 21/608 |
| 2016/0378806 A1* | 12/2016 | Hopcroft | G06F 16/93 |
| | | | 707/715 |
| 2016/0378828 A1* | 12/2016 | Hopcroft | G06F 16/2237 |
| | | | 707/718 |
| 2017/0046356 A1* | 2/2017 | Marantz | G06F 16/951 |
| 2017/0180294 A1* | 6/2017 | Milligan | H04L 51/02 |
| 2017/0220565 A1* | 8/2017 | Byron | G06F 16/1734 |
| 2017/0357661 A1* | 12/2017 | Hornkvist | G06F 16/2423 |
| 2018/0121545 A1* | 5/2018 | Chen | G06F 40/30 |
| 2018/0150874 A1* | 5/2018 | Chen | G06Q 30/0254 |
| 2018/0182015 A1* | 6/2018 | Su | G06Q 30/0631 |
| 2018/0218087 A1* | 8/2018 | Rapaka | H04L 67/306 |
| 2018/0232375 A1* | 8/2018 | Venkataraman | G06N 5/003 |
| 2018/0278560 A1* | 9/2018 | Miklos | H04L 51/02 |
| 2019/0079957 A1* | 3/2019 | Gao | G06N 20/00 |
| 2019/0121811 A1* | 4/2019 | Cherukuri | H04L 67/22 |
| 2019/0130013 A1* | 5/2019 | Kempf | G06N 20/00 |
| 2019/0179938 A1* | 6/2019 | Feuz | G06F 9/542 |
| 2019/0294731 A1* | 9/2019 | Gao | G06F 16/9535 |
| 2019/0392396 A1* | 12/2019 | Liu | G06N 20/00 |
| 2020/0004565 A1* | 1/2020 | Kulkarni | G06F 16/90335 |

OTHER PUBLICATIONS

Jansen et al., "Determining the User Intent of Web Search Engine Queries", Proceedings of the 16th International Conference on World Wide Web (WWW 2007), Banff, Alberta, Canada, May 8-12, 2007, pp. 1149-1150. (Year: 2007).*

* cited by examiner

Request Time Off

Category: Employee Files
Type: Navigate to page (/xhtml/pages/absence/timeOff.xhtml)

| Standard Paraphrases | Enable paraphrases of each row | | |
|---|---|---|---|
| Ask, take, Submit, Absence, Absences, Request, Time, day, Days, Off, Holiday, PTO, time-off, Account, Accounts, Leave, maternity, paternity, baby, child | Request Time Off | ○ | ✱ |
| Absence, Time, day, Days, Off, Edit, Change, Update, Cancel, Holiday, PTO, time-off, Request, requests, Absences, Correct, Account, Accounts, Leave | Update time off | ○ | ✱ |
| View, Show, see, look, Go, Check, Absence, Time, day, Days, Off, Holiday, PTO, time-off, Absences, Accounts, Account | View my time off | ○ | ✱ |
| Ask, take, Submit, Request, sick, Leave, illness, injury, day, Days | Request sick leave | ○ | ✱ |
| Ask, take, Submit, Request, vacation, Holiday, day, Days, Leave | Request vacation | ○ | ✱ |
| Custom Paraphrases | Enable custom paraphrases for each row | | Delete |
| ○ Add custom paraphrases | | | |

300

All types
time off

3 Actions
Manage Time Off Calendars
Manage Time Off Structures
Request Time Off Cancel

COMBINATION CONTENT SEARCH

TECHNICAL FIELD

The present disclosure relates to computer-implemented methods, software, and systems for facilitating the results of a search request by analyzing content that matches one or more action words.

BACKGROUND

Search engines generally display a list of results in response to a query provided by a searcher. The search engines can display the list of results based on a corpus of web pages or other resources that have been previously indexed. Current searches are limited to searching in loosely structured documentation systems that are disconnected from one another.

SUMMARY

The present disclosure involves systems, software, and computer implemented methods for facilitating the results of a search request by analyzing content that matches one or more action words. One example system includes a request received via interactions with an interface from a client device, the client device associated with a user, wherein the interface is associated with the repository of content and manages interactions between the client device and the repository of content based on the request from the user. Next, the system identifies one or more keywords from the request. The one or more keywords from the request are matched with at least one action from the repository of actions. In response to matching the one or more keywords from the request with the at least one action, one or more content documents are identified from the repository of content associated with the at least one action. The one or more identified content documents are filtered based on the one or more keywords from the request. The one or more filtered content documents are provided to the client device of the authenticated user in response to the received request.

Implementations can optionally include one or more of the following features. In some instances, a machine learning model is trained with the one or more actions from the repository of actions, the one or more content documents from the repository of content, previous requests by the user, and previous selections by the user corresponding to the content documents from the one or more content documents to identify the one or more content documents from the request of the user.

In some instances, the request and data identifying the user that transmitted the request are provided to the trained machine learning model to generate a predicted likelihood that a user will select a content document for each of the one or more content documents. In those instances, based on a determination that a subset of the content documents and corresponding generated predicted likelihoods is greater than a predetermined threshold, the subset of the content documents are provided to the client device.

In some instances, an authentication of the user corresponding to the client device is determined. The credentials of the user are compared to one or more stored credentials. In response to determining the credentials of the user matches the one or more stored credentials, authentication credential for an authenticated user corresponding to the client device is generated. In those instances, the authentication credential is provided to the client device for the authenticated user to transmit the request to the interface.

In some instances, master data is determined that corresponds to the user comprising at least one of locational data of the user, organizational data of the user, and employee class data of the user. In those instances, the master data and the one or more keywords are applied to match with the at least one action from the repository of actions.

In some instances, a selection of one of the content documents from the one or more filtered content documents that were provided to the client device is received. At least one of a link and an interviewing of the selected content document is provided to the client device.

In some instances, an indication is received that a user is entering the request in the client device. Based on the indication and while the user is entering the request, a content document is predicted that a user is likely to select based on historical selections of content documents by the user. In those instances, the predicted content document is provided to the client device.

In some instances, the at least one action is provided to the client device to display to the user while one or more of the content documents are identified from the repository of content using the at least one action.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is an example screen from one implementation of an interface for managing various data types to provide in search results and displaying action types in response to search requests.

FIGS. 4A-4C are example screenshots from an implementation of an interface for providing a search request and receiving search results that utilize various data types.

DETAILED DESCRIPTION

The present disclosure describes various tools and techniques associated with facilitating the results of a search request by analyzing content that matches one or more action words. A backend query module system supports the management of receiving a search query from a user, determining one or more action keywords that matches data found in the search query, and identifying one or more content documents that relate to the action keywords and the data found in the search query. The user can provide a request, through an interface on a client device, to the backend query module, where the backend query module can interpret an intent of the query and retrieve one or more keywords from the query. The backend query module can match the one or more keywords from the query to one or more action keywords found in an action database. Using the one or more matched action keywords, the backend query module can identify one or more content documents that relate to the user's search request and provide the one or more content documents for the user's review. By using one or more action keywords to identify content documents, this system improves over typical systems which may only perform text searching. The action keywords allow for a broader searching mechanism and allow for referencing and returning content documents that would not be typically returned in text searches. The results (e.g., the content documents) can be provided as links or as the documents themselves to the client device for the user to access. Additionally, the backend query module can organize a search to connect loosely structured databases and structured databases to allow for searching over various relevant content. The backend query module can also include a machine learning model to predict one or more content documents from the request provided by the user. Additionally, the backend query module can utilize master data that indicates a location of a user, for example, and adds to the search for recognizing the most relevant based on the location of the user.

Figure 1:
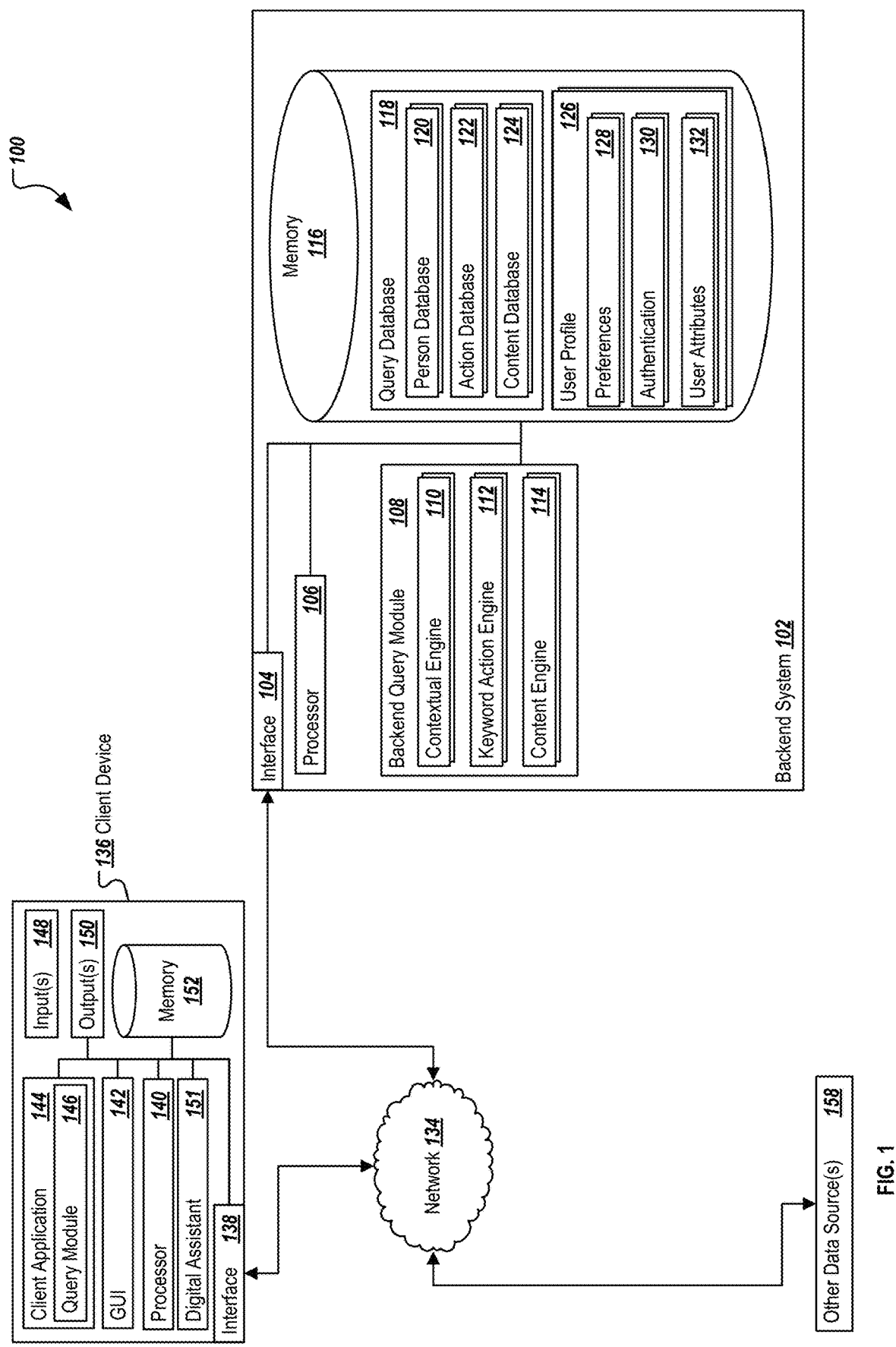
FIG. 1 is a block diagram illustrating an example system for facilitating the results of a search request by analyzing content that matches one or more action words.

Turning to the illustrated example implementation, FIG. 1 is a block diagram illustrating a system 100 for facilitating the results of a search request by analyzing content that matches one or more action words. System 100 includes functionality and structure associated with receiving inputs from client device 136 (associated with a user), analyzing the received input at the backend system 102 to identify one or more search keywords of the received input. Based on the received input, at least one action keyword is identified from the one or more identified search keywords. The at least one action keyword can be used to additionally identify one or more content documents from a plurality of various databases based on the one or more search keywords. The system can then provide the identified one or more content documents back to the client device for the user's review, such as by including the one or more content documents in a search result set. The system 100 includes or is communicably coupled with a backend system 102, client device 136, one or more other data source(s) 158, and a network 134. System 100 is a single example of possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some implementations, particular operations and functionality described herein may be executed at either the client device 136, the backend system 102, or at one or more other non-illustrated components, as well as a combination thereof.

As used in the present disclosure, the term "computer" is intended to encompass any suitable processing device. For example, client device 136 and the backend system 102 may be any computer or processing device (or combination of devices) such as, for example, a blade server, a general-purpose personal computer (PC), MAC, workstation, UNIX-based workstation, embedded system or any other suitable device. Moreover, although FIG. 1 illustrated particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 136 may be any system which can request data, execute an application (e.g., client application 144), and/or interact with the backend system 102 and the interface 104. The client device 136, in some instances, may be any other suitable device, including a mobile device, such as a smartphone, a tablet computing device, a smartwatch, a laptop/notebook computer, a connected device, or any other suitable device. Additionally, the client device 136 may be a desktop or workstation, server, or any other suitable device. Similarly, the backend system 102 may be a server or a set of servers, a cloud-based application or system, or any other suitable system. In some instances, the client device 136 may execute on or be associated with a system executing the backend system 102. In general, each illustrated component may be adapted to execute any suitable operating system, including Linux, UNIX, Windows, Mac OS®, Java™, Android™, Windows Phone OS, or iOS™, among others.

The backend system 102 can perform functionality associated with one or more interfaces 104, can perform operations associated with receiving input from a client device 136 (e.g., via interface 138) associated with the interface 104, and can analyze the received input to determine a context (e.g., a particular question, a comment, or other communication to which a response may be generated for the interface 104) and retrieve one or more search keywords from the request. Using the determined context and/or the one or more search keywords of the input, the backend system 102 can determine at least one action from the one or more keywords. Once the backend system 102 determines the at least one action, the backend system 102 can determine one or more content documents from the at least one action and use the one or more search keywords to further narrow the determined one or more documents. The backend system 102 can then provide the one or more documents over the network 134 to the client device 136 to display on the interface 138.

As illustrated, the backend system 102 includes an interface 104, a processor 106, a backend query module 108, and a memory 116. Different implementations may include additional or alternative components, with FIG. 1 meant to be an example illustration of one possible illustration. While illustrated separate from one another, at least of these components, in particular the query module and memory 116 may be combined within a single component or system, or may be implemented separate from one another, including at different systems and/or at remote components.

Interface 104 is used by the backend system 102 for communicating with other systems in a distributed environment—including within the system 100, connected to the backend system 102 and/or network 134, as well as other systems or components communicably coupled to the network 134. Generally, the interface 104 includes logic encoded in software and/or hardware in a suitable combination and operation to communicate with the network 134 and other communicably coupled components. More specifically, the interface 104 may comprise software supporting one or more communication protocols associated with communications such that the backend system 102, network 134, and/or interface's hardware is operable to communicate physical signals within and outside of the illustrated system 100.

Network 134 facilitates wireless or wireline communications between the components of the system 100 (e.g., between combinations of the backend system 102, client device(s) 136, and/or other components, among others) as well as with any other local or remote computer, such as additional mobile devices, clients, servers, remotely executed or located portions of a particular component, or other devices communicably coupled to network 134, including those not illustrated in FIG. 1. In this illustrated environment, the network 134 is depicted as a single network, but may be comprised of more than one network with departing from the scope of this disclosure, so long as at least a portion of the network 134 may facilitate communication between senders and recipients. In some instances, one or more of the illustrated components (e.g., the backend system 102) or portions thereof (e.g., the backend query module 108, the memory 116, or other portions) may be included within network 134 as one or more cloud-based services or operations. The network 134 may be all or a portion of an enterprise or secured network, while in another instance, at least a portion of the network 134 may represent a connection to the Internet. In some instances, a portion of the network 134 may be a virtual private network (VPN) or an Intranet. Further, all or a portion of the network 134 can comprise either a wireline or a wireless link. Example wireless links may include 802.11a/b/g/n/ac, 802.20, WiMax, LTE, and/or any other appropriate wireless link. In other words, the network 134 encompasses any internal or external network, networks, sub-network, or combination thereof operable to facilitate communications between various computing components inside and outside the illustrated system 100. The network 134 may communicate, for example, Internet Protocol (IP) packets, Frame Relay frames, Asynchronous Transfer Mode (ATM) cells, voice, video, data, and other suitable information between network addresses. The network 134 may also include one or more local area networks (LAMs), radio access networks (RANs), metropolitan area networks (MANs), wide area networks (WANs), all or a portion of the internet and/or any other communication system or systems at one or more locations.

The backend system 102 also includes one or more processor 106. Although illustrated as a single processor 106 in FIG. 1, multiple processors may be used according to particular needs, desires, or particular implementations of the system 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the backend system 102, in particular, those related to executing the various modules illustrated therein and their related functionality. Specifically, the processor 106 executes the algorithms and operations described in the illustrated figures, as well as the various software modules and functionalities, including the functionality for sending communications to and receiving transmissions from the client device 136, as well as to process and prepare responses to received input associated with an interface 104. Each processor 106 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™ Visual Basic, assembler, Perl®, Swift, HTML5, any suitable version of 4GL, as well as others.

As illustrated, the backend system 102 includes, is associated with, and/or executes the backend query module 108. The backend query module 108 may be a program, module component, agent, or any other software component which manages and conducts communication with the interface 104 and the memory 116. In some instances, the backend query module 108 may be executed remotely from the backend system 102, where the backend system 102 performs operations associated with receiving and parsing queries, identifying actions from the queries, and identifying one or more content documents from the actions, but where the backend query module 108 assists in identifying the actions and identifying the content documents using the keywords from the response and/or the responses that were provided. The query module 146 can be accessed via a website, a web service interaction, a particular application (e.g., client application 144), or it may be a backend portion of a digital virtual assistant application or functionality of a particular operating system, such as Apple's Siri, Google's Assistant, Amazon's Alexa, Microsoft's Cortana, or others. In some instances, a remote agent or client-side portion of the backend query module 108 may execute at the client device 136, where inputs can be provided and responses can be presented to the user of the client device 136, while some or all of the processing is performed at the backend system 102.

In some instances, the backend query module 108 can include a contextual engine 110, an keyword action engine 112, and a content engine 114. The contextual engine 110 can represent any suitable natural language processing engine, and performs operations related to understanding a set of input received at the backend system 102. Examples of the contextual engine 110 could be used or implemented can include a plurality of web services and backend applications, including IBM's Watson, Google Cloud Natural Language API, Amazon Lez, Microsoft Cognitive Services, as well as any proprietary solution, application, or service. The processing performed by the contextual engine 110 can include processing the received input by identifying a context or intent associated with the input received via the interface 104. The result of the contextual engine 110 can be a set of lexical semantics of the received input. In some instances, the results produced by the contextual engine 110 can include a string or a short code that describe the intent of the received request, one or more keywords parsed or processed from the request, user context data corresponding to the user using the client device 136, and authentication data corresponding to the client device 136 that transmitted the request.

In some instances, the contextual engine 110 can obtain additional information about the particular user profile associated with the received input. The contextual engine 110 can retrieve additional user profile information to provide to the keyword action engine 112. In particular, the contextual engine 110 can retrieve data associated with a particular user profile (determined from the received input) from a plurality of user profiles 126. The contextual engine 110 can retrieve data from the person database 120 indicative of the user who transmitted the request. In response to retrieving the data from the person database 120, the contextual engine 110 can use the data retrieved from the person database 120 as an index to retrieve a corresponding user profile of that individual from the plurality of user profiles 126. For example, the request may include a user name and password data of a user who logged in to the client application 144. The contextual engine 110 can use the user name and password data to retrieve corresponding person identification data from the person database 120. The data from the person database 120 may include static information about the user, such as the user's name, age, and employment description. The contextual engine 110 then uses the data from the person database 120 for the particular user to access a corresponding user profile from the plurality of user profiles 126. The plurality of user profiles 126 can be stored in the memory 116 or stored in an external memory location. In other implementations, the person database 232 can provide relevant search results for a particular user in response to a search request provided by a client device.

The contextual engine 110 can identify preferences 128 associated with the selected user profile, authentication 130 associated with the user profile, and user attributes 132 associated with the selected user profile. The contextual engine 110 can identify a set of preferences (e.g., preferences 128) previously defined by the user or determined based on previous interactions and other user operations. The set of preferences 128 can include, for example, a display type, a preference of data types, a color scheme to display results, a number of results to display, and a number of devices corresponding to the user that transmitted the request to display the results.

Further, the user profile 126 may store user attributes 132 corresponding to the user. The user attributes can include static location information associated with the user that may be stored locally or accessible via the client device 136. This static location information can be used to add to the data to identify content documents from the query database 118. Additionally, the user attributes 132 may store dynamic location information associated with the user. For example, static location information associated with the user may include a home or business address of the user, whereas dynamic location information associated with the user may include a current location of the client device 136 tracked by global positioning satellite (GPS) locational positioning information. The user attributes 132 can additionally include previously known dynamic location information of the user that transmitted the request. The user attributes 132 can also include a number of devices corresponding to the user and a number of devices with which the user expects to receive the results of the request. Additionally, the user attributes 132 can include master data corresponding to a particular user. The master data can include the static location information, the dynamic location information, organizational data of the corresponding user, and employee class data of the corresponding user. For example, organizational data of the corresponding user can include which organization the user belongs to, such as, the Engineering Department, the Financial Department, the Human Resources Department, and/or the Product Development Department. The Employee Class data of the corresponding user can include the user's title in an organization, such as Engineer III, Human Resources Director, or Chief Financial Officer. The master data, along with the one or more keywords from the request can be used by the keyword action engine 214 for matching to one or more action keywords.

Each of the plurality of user profiles 126 can include authentication 130, or information and/or credentials used to authenticate the user. The authentication 130 can be used by the backend system 102 to identify and/or verify the credentials of the user. In particular, when a user provides a request from the client device 136 to the backend system 102, that request may be associated with or can include one or more credentials of the user. For example, the one or more credentials can include a username, a password, a token for authentication, and other authentication credential data. The request may also be encrypted and require decryption. Upon the backend system 102 receiving the requested input, the contextual engine 110 can retrieve the one or more credentials from or associated with the requested input to determine whether the identified user that transmitted the request is authenticated. In particular, the contextual engine 110 can compare the one or more credentials to each authentication 130 corresponding to the selected user profile from the plurality of user profiles 126.

Once the contextual engine 110 finds a match between the one or more credentials in the received input to a particular authentication 130 in a corresponding user profile, the contextual engine 110 can authenticate the user that sent the received input, and/or can confirm that the client device 136 identification provided by or associated with the request is authenticated. In some instances, the contextual engine 110 can generate an authentication credential in response to determining the credentials of the user matches the one or more stored credentials. The generated authentication credential can include one or more keys, a token, an identifier of the accepted credential, or another credential to provide to the keyword action engine 112. Additionally, the contextual engine 110 can provide the authentication 130 back to the client device 136 indicating that the client device 136 is allowed to communicate with the backend system 102.

The keyword action engine 112 can receive the output of the contextual engine 110 and prepare to identify at least one or more action keywords from the query database 118. The keyword action engine 112 can be any suitable program, module component, agent, or any other software component that communicates with the contextual engine 110 and the query database 118. The processing performed by the keyword action engine 112 can include processing the received input from the contextual engine 110 and identify one or more action keywords from the query database 118. The keyword action engine 112 can identify or otherwise determine at least a base set of action keywords to be used in representing the set of semantics provided by the contextual engine 110. The base set of action keywords are words, phrases, and/or token associated with the semantics provided by the contextual engine 110, and may be initial representation of the natural language result. For example, the request from the client device 136 can include keywords such as "Holiday," "PTO," maternity," "paternity," "baby," and/or "child." The contextual engine 110 can determine these keywords from the request, authenticate the user, and determine the context of these keywords relate to an employee's time off. The keyword action engine 112 can determine from the keywords and from context of the keywords that the action keyword corresponds to "Request Time Off." In particular, the keyword action engine 112 searches the action database 122 using the keywords and the context of the keywords for a corresponding action keyword.

The action database 122 can include, in tabular format, one or more keywords indexed to an action word. Additionally, the action database 122 can include action keywords corresponding to master data. For example, the action database 122 can include action keywords that fall under organizational data and under employee class data. The keyword action engine 112 can search under a particular organizational data tag and/or under an employee class data tag in the action database 122 for one or more action keywords. By providing, an organizational data tag and an employee class data tag to the action database 122, the keyword action engine 112 can retrieve action keywords with more specified constraints to further narrow the action keywords retrieved from the action database 122 and thus, limiting the amount of action keywords that are searched in the action database 122. Ultimately, limiting the amount of action keywords that area searched speeds up the keyword action engine 112's processing. Thus, the keyword action engine 112 understands that the user is requesting for content documents related to the action of "Request Time Off." The keyword action engine 112 can provide the action word "Request Time Off" to the content engine 114.

The content engine 114 can receive the output of the keyword action engine 112 and prepare to identify one or more content documents from the memory 116 using the action keyword. The content engine 114 can be any suitable program, module component, agent, or any other software component that communicates with the keyword action engine 112 and the content database 124. In some instances, the content engine 114 uses the received at least one action keyword from keyword action engine 112 to retrieve one or more content documents from the content database 124. In particular, the content database 124 can include one or more content documents relating to a particular content. For example, the content database 124 can be related to a human resources database, a financial database, a customer database, JAM Collaboration pages, one or more Portals, or a combination of the three, to name a few examples. The documents in the content database 124 can be indexed by one or more action keywords. Additionally, the content documents in the content database 124 can be indexed by a subject. For example, the content database 124 can group one or more content documents together under human resources, group one or more content documents together under finances, and group one or more other content documents together under customers. Thus, when the content engine 114 searches for content documents in the content database 124, the content engine 114 can more efficiently search in a categorical space in the content database 124 based on the content of the action keywords.

In some instances, the content engine 114 can also search the content database 124 using one or more synonyms of the action keywords. In particular, the content engine 114 can search the content database 124 using the action keywords to identify content documents as well as one or more synonyms of the action keywords to broaden the search of the content engine 114. For example, the content engine 114 can search for content documents using the action keywords "Request Time Off." Using just the action keywords, the content engine 114 may identify one content document, such as "Document A to request time off from boss." Additionally, the content engine 114 can also search for content documents using synonyms of the action keywords that include "Ask," "Comp Time," "Maternity," "furlough," "pay during leave" or "leave of absence," to name a few examples. Using the synonyms of the action keywords, the content engine 114 may identify one or more additional content documents related to the synonyms, such as "Document B requesting for a leave of absence," "Document C for maternity/paternity leave," and "Document D for a timesheet for payment data while on leave." Thus, the content engine 114 identifies retrieves one or more additional content documents in response to using synonyms from the action keywords in addition to the identified action keywords to search the content database 124. In some instances, the one or more synonyms of the action keywords are accessed and retrieved from the action database 122 at runtime upon turning on the backend system 102 in order to have them accessible in response to receiving requests from users.

The content engine 114 can then use the one or more search keywords from the request to further narrow/filter the content documents retrieved by the content engine 114. In particular, the content engine 114 can additionally filter the content documents retrieved from the content database 124 by filtering the title of the content documents, filtering the metadata of the content documents, and/or filtering the content within the content documents using the one or more search keywords from the request. For example, if the request included the keywords "Holiday" and "PTO", and the content engine 114 identified "Document E for holiday time off" and "Document C for maternity/paternity leave" using the action keyword of "Request Time Off," the content engine 114 would filter out "Document C for maternity/paternity leave" because Document C's title and corresponding contents does not include the keywords "Holiday" and/or "PTO."

In some instances, the keyword action engine 112 may transmit the action keywords to the client device 136 to display on the interface 138 while the content engine 114 searches for content documents. By providing the action keyword(s) to display on the interface 138 on the client device 136, the user is made aware of the content document types that will be identified with the action keywords.

As illustrated, the backend system 102 includes memory 116. In some implementations, the backend system 102 includes a single memory or multiple memories. The memory 116 may include any type of memory or database module and may take the form of volatile and/or non-volatile memory including, without limitation, magnetic media, optical media, random access memory (RAM), read-only memory (ROM), removable media, or any other suitable local or remote memory component. The memory 116 may store various objects or data, include caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the backend system 102. Additionally, the memory 116 may store any other appropriate data, such as VPN applications, firmware logs and policies, firewall policies, a security or access log, print or other reporting files, as well as others. As illustrated, memory 116 includes, for example, query database 118 and the user profile 126, described herein. Memory 116 may be local to or remote to the backend system 102, and may be available remotely via network 134 or an alternative connection in such instances where not locally available. Further, some or all of the data in memory 116 in FIG. 1 may be located outside of the backend system 102, including within network 134 as cloud-based storage and data.

System 100 includes at least one client device 136, and may include a plurality of client devices 136 in some instances. Each client device 136 may generally be any computing device operable to connect to or communicate within the system 100 via network 134 using a wireline or wireless connection. In general, the client device 136 includes an electronic computer device operable to receive, transmit, process, and store any appropriate data associated with the system 100 of FIG. 1. As illustrated, the client device 136 can include one or more client applications, including the client application 144 and the digital assistant 151. In some instances, the digital assistant 151 may be a part of the operating system executing on the client device 136, or may be a standalone application or client-side agent of a backend application. In some instances, the client device 136 may include a device that includes one or more input(s) 148, such as a keypad, touch screen, camera, or other device(s) that can interact with the client application 144 and/or digital assistant 151 and other functionality, and one or more output(s) 150 that convey information associated with the operation of the applications and their application windows to the user of the client device 136. The output(s) 150 can include a display, speakers, or any other suitable output component. The information presented by the output(s) can include digital data, visual information, auditory output, or a graphical user interface (GUI) 142, as shown with respect to the client device 136. In general, client device 136 includes an electronic computer device operable to receive transmit, process, and store any appropriate data associated with the system 100 of FIG. 1.

Client application 144 can be any type of application that allows the client device 136 to request and view content on the client device 136. In some instances, client application 144 may correspond with one or more backend appliances or functionality, including an application or platform associated with the backend system 102. In some instances, the client application 144 can be associated with a client side version of the query module 146, where the client-side version of the query module 146 can represent a means for users to provide inputs to the interface 104 and receive the output including a set of content documents of the same for viewing at the client device 136.

In many instances, the client device 136 may be a mobile device, including but not limited to, a smartphone, a tablet computing device, a laptop/notebook computer, a smart-watch, or any other suitable device capable of interacting with the backend system 102 and the interface 104. One or more additional client applications 144 may be present on the client device 136, and can provide varying functionality for users. In some instances, client application 144 may be a web browser, mobile application, cloud-based application, or dedicated remote application or software capable of interacting with at least some of the illustrated systems via network 134 to request information from and/or respond to one or more of those systems.

The digital assistant 151 may be any interactive artificial or virtual intelligence component, agent, or other functionality that can be interacted with by a user, either textually or verbally through one or more input(s) 148 (e.g., a microphone), manually through one or more input(s) 148 (e.g., physical or virtual keyboards, touch screen buttons or controls, other physical or virtual buttons, etc.), or through captured gestures or movements identified by the client device 136. In general, the digital assistant 151 may be a software agent, module, or component, among others, that can perform tasks or services for an individual in response to one or more inputs, and can include or represent a particular query module associated with the backend query module 108. As indicated, any one of numerous commercial examples may be used, as well as other proprietary or application-specific assistants. The digital assistant 151 may work and interact via text (e.g., chat), voice, image submission, or other suitable inputs. Some virtual assistants can interpret input using natural language processing (NLP) to match user text or voice input to executable commands. In some instances, the digital assistant 151 can be interacted with to initiate and perform one or more input and response interactions described herein. In some instances, the digital assistant 151 may be a standalone application (e.g., Google Assistant executing on an iPhone), functionality included in a particular application used for other purposes (e.g., an Alexa-enabled Amazon app), or an agent or other functionality built into the operating system (e.g., Siri on Apple's iOS).

As illustrated, the client device 136 may also include an interface 138 for communication (similar to or different from interface 104), a processor 140 (similar to or different from processor 106), memory 152 (similar to or different from memory 116), and GUI 142. GUI 142 can interface with at least a portion of the system 100 for any suitable purpose, including generating a visual representation of the client application 144 and/or the digital assistant 151, presenting a pop-up or push notification or preview thereof, presenting the UI associated with the query module 146, or any other suitable presentation of information. GUI 142 may also be used to view and interact with various Web pages, applications, and Web services located local or external to the client device 136, as well as information relevant to the client application 144. Generally, the GUI 142 provides the user with an efficient and user-friendly presentation of data provided by or communicated within the system. The GUI 142 may include a plurality of customizable frames or views having interactive fields, pull-down lists, and buttons operated by the user. For example, the GUI 142 may provide interactive elements that allow a user to view or interact with information related to the operations of processes associated with the backend system 102 and any associated systems, among others. In general, the GUI 142 is often configurable, supports a combination of tables and graphs (bar, line, pie, status dials, etc.), and is able to build real-time portals, application windows, and presentations. Therefore, the GUI 142 contemplates any suitable graphical user interface, such as a combination of a generic web browser, a web-enabled application, intelligent engine, and command line interface (CLI) that processes information in the platform and efficiently presents the results to the user visually.

The other data sources 158 illustrated in FIG. 1 may be any other data sources that provide additional information to the backend system 102. The information may be used by the content engine 114, along with user specific information to identify one or more content documents as described herein. Any number of other data sources 158 may be used in alternative implementations.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
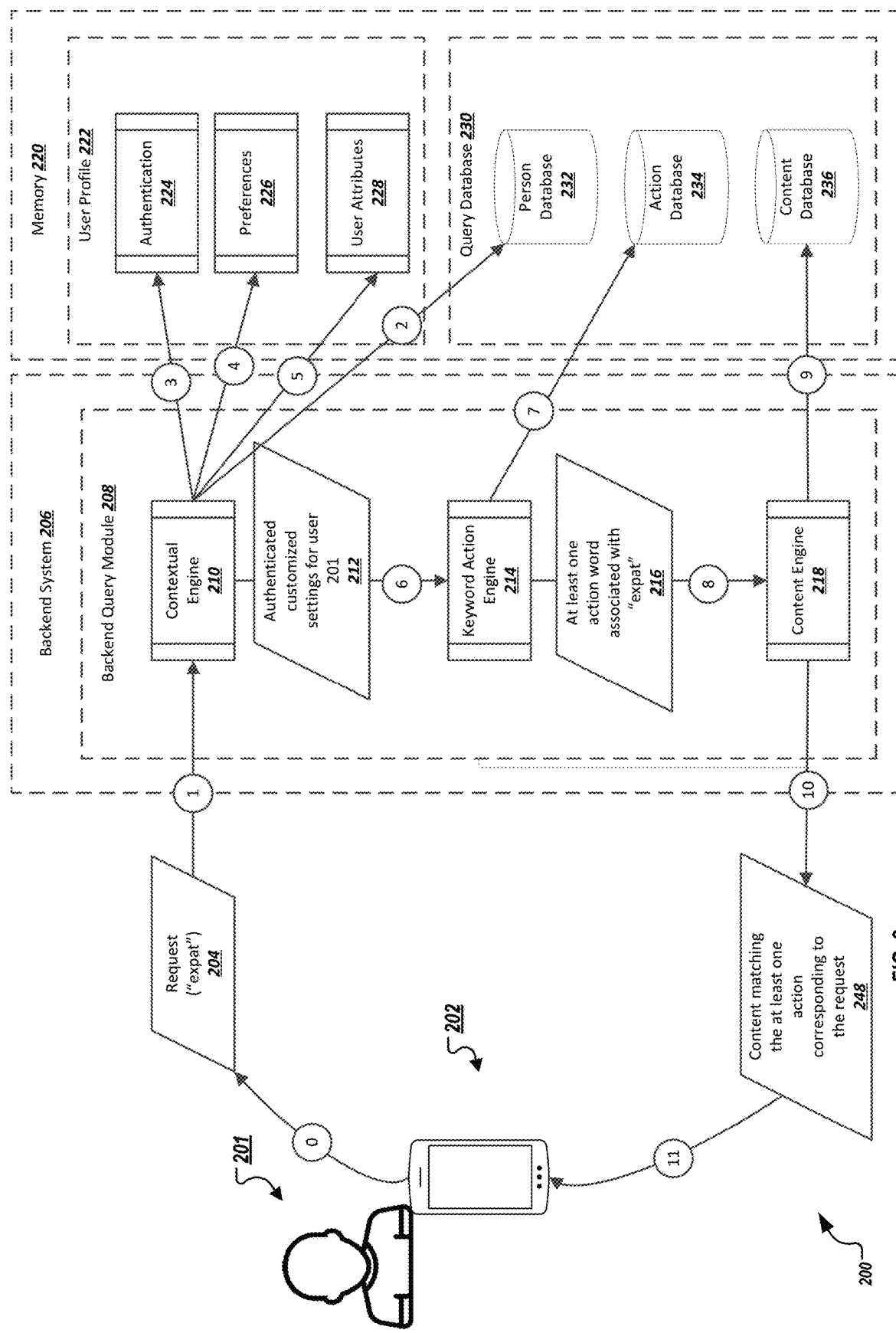
FIG. 2 is a data and control flow of example interactions performed by a backend system that manages utilizing various data types to provide in search results.

FIG. 2 is a data and control flow of example interactions 200 performed by a backend system that manages utilizing various data types to provide in search results. The diagram provides an example set of operations and interactions to receive a response, determine context and keywords of the response, identify an action keyword associated with the request, identify one or more content documents associated with the action keyword based on the keywords of the request, and provide a formulated response back to the client device of the user. A user 201 uses a client device 202 to provide the request. In particular, a user 201 interacts with an interface (or client device at which a user 201 is interacting with the interface), a backend system 206 (including a backend query module 208), a memory 220 (including a user profile 228 and a query database 230). These components may be similar to or different from the components described in FIG. 1.

As illustrated, the user 201 interacts with a client device 202 to provide a conversational or user input 204 to the backend query module 208 (0). In particular, the user input 204 is provided or transferred to a backend query module 208 to be processed by a contextual engine 210, a keyword action engine 214 and a content engine 218. The user input 204 is first provided to a contextual engine 210 to determine both an intent of the input 204 and identify one or more keywords found in the user input 204 (1). Additionally, the contextual engine 210 seeks to authenticate the user 201 communicating with the backend query module 208. In some instances, the determination of the intent and the identification of one or more keywords from the request may be separate activities or actions. The intent can represent the question, query, or information associated with the user input 204, and can be determined using any suitable method. In some instances, a natural language processing (NLP) engine may be used to understand the intent, which is what the user input 204 desires, is asking about, or otherwise relates to. Additionally, the contextual engine 210 identifies one or more keywords from the user input 204. For example, if the user input 204 includes the phrase "requesting time off PTO for holiday," the contextual engine 210 may retrieve keywords such as "requesting," "time," "off," "PTO," "for," and "holiday."

Additionally, the contextual engine 210 seeks to determine the user 201 that transmitted the user input 204 (2). In particular, the contextual engine 210 can use data found in the user input 204 to identify the user 201. For example, the user input 204 can include data identifying client device 202, such as, an IP address, a telephone number, a MAC address, and login credentials of the user 201 into the client device 202. The contextual engine 210 can use this data identifying the client device 202 from the user input 204 to identify the user 201 using the person database 232. The person database 232 can include, for example, identification information of each employee found in a corporation, of each family member found in a family, or each professional athlete on a professional sports teams. Using the data identifying the client device 202 from the user input 204, the user 201 can be identified. For example, the telephone number (111)111-1111 identifying the client device 202 is found to be associated with the user John Smith. Thus, the contextual engine 210 can determine the user 201 is John Smith.

Once the user 201 has been identified, the contextual engine 210 can authenticate the user/client device 202 by communicating with the authentication 224 of each user profile 222 (3). In particular, the contextual engine 210 can authenticate the client device 202 or the user associated with the input using the received input 204. The contextual engine 210 can retrieve one or more credentials from or associated with the received input (e.g., username, password, token, and/or key) and compare the one or more credentials to the authentication 224 portion of each user profile from the plurality of user profiles 222. Once the contextual engine 210 determines a match exists to a credential found in the authentication 224 portion of each user profile, the contextual engine 210 can proceed with setting up how to display the search results to the users.

The contextual engine 210 can retrieve data corresponding to the preferences 226 of the user profile 222 (4). The set of preferences 226 of the user profile 222 can indicate how the user 201 prefers to receive and view the search results. For example, the set of preferences 226 can include a display type of the search results, a preference of data types (e.g., word documents, PDF documents, or web based documents), a color scheme to display the results in order of importance, a number of results to display, a ranking order (e.g., ascending or descending), matching type of results, whether to send the results to the user's email or text messaging inbox, and a number of devices corresponding to the user that transmitted the request to display the results.

In some instances, the contextual engine 210 can retrieve data corresponding to the user attributes 228 of the user profile 222 (5). The user attributes 228 of the user profile 222 can include the master data of the user 201. For example, the user attributes 228 can include static location information and dynamic location information associated with the user. For example, the static location information associated with the user 201 can include a current residence address of the user, an email address, and a telephone number of the user. Additionally, the dynamic location information associated with the user may include a current location of the client device 136 tracked by locational positioning information using GPS, accelerometer, and other data positioning sources. The user attributes 228 can also specify a number of devices corresponding to the user and a number of devices with which the user expects to receive the results to his request.

After authenticating and determining the preferences 226 and user attributes 228 corresponding to the particular user profile 222, the contextual engine 210 can package the data 212 and transmit the data 212 to the keyword action engine 214 (6). The data 212 includes data from the user input 204, data indicating the user has been authenticated, the preferences of the corresponding user 201, and data indicating the attributes of the user 201. In other instances, the contextual engine 210 can store the data 212 in memory and transmit an indication to the keyword action engine 214 of the location of the data 212 in memory. The keyword action engine 214 can access the address of the location of the data 212 in memory to retrieve its contents. In some instances, the request provided by the user 204 may be requesting for data corresponding to a different user found in the person database 232. For example, the data from the user input 204 may retrieve a particular user profile 222 corresponding to another user, such as a different employee, and retrieve attributes for both users. The context engine 210 may seek to retrieve user attribute data of the other user and user attribute data of the user that transmitted the request 204. Thus, the context engine 210 can generate data 212 that includes data from the user 201 that transmitted the request 204 and data of another user, such as an employee working under user 201, found in the person database 232.

In some instances, the keyword action engine 214 uses the data 212 to identify one or more action keywords found in the action database 234 (7). In particular, the keyword action engine 214 can use the intent of the user input 204 and the one or more keywords found in the user input 204 to identify one or more action keywords found in the action database 234. The action keywords correspond to actions that a person can take in an organizational, residential, or professional environment. For example, the action words can include "Request Time Off," "Update work hours," "View time off," "Request sick leave," "Request vacation time," and "Apply for a promotion." In other instances, the one or more action keywords can be other keywords, such as search keywords, keywords indicative of people, keywords representing subjects, keywords representing company projects, and keywords representing locations of employees around the globe. The keyword action engine 214 can use the one or more keywords and the intent determined from the user input 204 to determine one or more action keywords. For example, the keyword action engine 214 can perform word matching between the one or more keywords found in the user input 204 to one or more keywords found in the action database 234. The one or more keywords found in the action database can correspond to a particular action keyword. For example, for the action keywords "Request Time Off," the action database 234 can include corresponding keywords "ask," "take," "submit," "absence," "request," "time," "day," "Days," "Off," "Holiday," "PTO," "time-off," "Account," "accounts," "Leave," "maternity," "paternity," "baby," and "child."

Additionally, the keyword action engine 214 can use the intent determined from the user input 204 to determine one or more matching words. For example, if the keyword action engine 214 determines that the intent of the of the user input 204 includes "requesting for expat info" or "requesting for time off info," then the keyword action engine 214 can search in a specified content area of the action database 234. In particular, the action database 234 can include organized specified content databases. Thus, each specified content database can include one or more corresponding actions keywords. For example, for an intent that includes "requesting for time off info," the action database 234 may include action keywords such as "Request Time Off," "Update Time Off," and "View My Time Off," to name a few examples. For the intent that includes "requesting for expat info," the action database 234 may include action keywords such as "Request Expat Info," "Expat Locations," "Expat Moving Instructions," to name a few examples. By using the intent determination, the keyword action engine 214 can minimize the amount of action keywords to search over in the action database 234 and as a result, speed up the searching process. In some instances, the keyword action engine 214 may identify multiple action keywords that match the one or more keywords from the request or that match the intent of the request. The keyword action engine 214 can retrieve the one or more action keywords and provide the action keywords to the content engine 218 along with the preferences from the data 212 of the user.

In some instances, content engine 218 uses the one or more action keywords and the data 212 to retrieve one or more content documents from the content database 236 (9). In particular, the content engine 218 can search the content database 236 using the one or more action keywords as an index and retrieve the one or more content documents corresponding to the index. For example, the content engine 218 can retrieve one or more content documents that fall under the action keywords of "Request Expat Info" and "Expat Locations." These content documents include "Document G for sign up information," "Document H for Expat Locations," and "Document I for expat travel arrangements."

The content engine 218 can retrieve each of these documents and further perform one or more additional actions on each of these documents. In particular, the one or more additional actions on each of these documents can include further narrowing the selection of the documents based on the one or more keywords from the request. For example, continuing with Documents G, H, and I, the content engine 218 can then compare each of these documents with the keywords "expat," "travel", and "location" from the request. The content engine 218 may perform keyword matching between the keywords found in the request with keywords in the document's title, the content of the document, or the metadata of the document. In this example, comparing the keywords "expat," "travel," and "location" returns Document H and Document I, without Document G, considering Document G does not have any of the keywords from the request in found in Document G's title, content, or metadata.

In some instances, the content engine 218 can apply the user's preferred preferences to the set of search results. For example, the content engine 218 can apply a color scheme to the content documents results that indicate a strength level of matching. The content engine 218 can place the search results in a list and color the top result in the list (e.g., the strongest match) a color, such as green, and the weakest result in the list another color, such as red. Additionally, the content engine 218 can rank the order of the set of results. The order can be ranked in various manners, for example, ascending order of a strength of a match, descending order of a strength of a match, or alphabetical order. In some instances, the content engine 218 may suggest additional documents that do not fall under the content document found using the determined action keyword, but might suggest additional documents that the user might find useful. For example, if the content engine 218 determines that "Document H for Expat Locations" and "Document I for expat travel arrangements", the content engine 218 may also suggest Document B requesting for a leave of absence while the particular user is on Expat travel. Document B can be added to the search results list.

The content engine 218 can package the search results and transmit the search results to the client device 202 (10). The content engine 218 can package the search results into a list 248 and prepare to transmit the list. For example, the content engine 218 can transmit a hyperlink of the list 248, a location in memory 220 for the client device 202 to access, the content documents themselves, or the content documents in a packaged format. The client device 202 can receive the list 248 and display the content documents from the list 248 (11). The user 201 can individually review and access each of the documents in the list by interacting with the display of the client device 202.

In some instances, the backend query module 208 can include a machine learning model to generate a predicted likelihood that a user will select a particular content document to review from the one or more content documents. By utilizing a machine learning model, the backend query module 208 can quickly provide content documents based on the keywords the user provides in the request. Thus, the backend query module 208 can bypass matching the search keywords to the action words, bypass matching action words to the content documents, and bypass filtering the matched content documents. Instead, the backend query module 208 can identify one or more content documents from the one or more keywords in the request using the machine learning model.

The backend query module 208 can train the machine learning model with the data from the memory 116. In particular, the backend query module 208 can train the machine learning model with one or more actions from the person database 232, the action database 234, the one or more content documents from the content database 236, previous requests transmitted by a particular user, and previous selections made by the user corresponding to the content documents. The machine learning model can be, for example, a neural network, such as a recurrent neural network. The neural network can include one or more long short short-term memory (LSTM) layers and can include multiple LSTM layers. In another example, the machine learning model can be a bidirectional recurrent neural network model. The backend query module 208 can continuously train the machine learning model each time a new request is transmitted, new content documents have been added to the content database 236, and a content document has been selected by the user 201 on the client device 202 for review.

During implementation, for the trained machine learning model to generate a predicted likelihood that a user will select a particular content document from each of the content documents in the content database 236, the backend query module 208 provides data identifying the request and data identifying the user that transmitted the request to the trained machine learning model to generate the predicted likelihood for each content document. The trained machine learning model can generate a number from 0 to 1 or 0% to 100% for each content documents, indicating whether a user is likely to select a particular content document. Once the trained machine learning model generates a likelihood for each content document, the backend query module 208 compares each generated likelihood for each content document to a predetermined threshold. If a generated likelihood for a particular content document is greater than the predetermined threshold, then the backend query module 208 prepares to send that corresponding particular content document to the client device 202 for the user 201 to review. For example, a subset of the content documents from the content database 236 may be determined by the trained machine learning model to be selected by the user 201. The backend query module 208 can transmit the subset of the content documents to the client device 202 of the user 201 for review.

In response to a user 201 selecting a content document to review on his/her client device 202, the client device 202 can send an indication to the backend query module 108 indicating which content document the user has selected for review. In some instances, the backend query module 208 can provide a link and/or an interactive viewing or the selected content document to the client device 202 in response to receiving the indication. Additionally, if the client device 202 already has the content document, the backend query module 108 can store an indication of the selected document by the user 201 for training the machine learning model.

FIG. 3 is an example screen from one implementation of an interface 300 managing various data types to provide in search results and displaying action types in response to search requests. In some instances, a user, such as user 201, can manage user attributes and preferences for receiving search results using the client device 202. The user 201 can manage user attributes for a particular action keyword. As illustrated in FIG. 3, the user 201 can manage the following attributes for the action keyword "Request Time Off." In particular, the screen 302 is displayed on the client device 202. The user 201 can set preferences for which action keyword is to be displayed and further searched upon submission of one or more keywords in a request. Column 304 of screen 302 illustrates one or more keywords the user can set for a particular action keyword. The various action keywords are shown in column 306. The column 308 illustrates the various languages a user can set for keyword searching. For example, the user 201 can search for keywords in English, Italian, and Spanish for the "Request Time Off" action keyword, and German, Russian, and Italian for the "Update Time Off" action keyword.

In some instances, the user 201 can manage customized search keywords and customized action keywords as shown in row 312. For example, the user 201 can set one or more search keywords, such as "pay," "hours," "salary," and "annual" to be associated with a customized action keyword, such as "View Salary." The user can customize a keyword to be associated with a customized action keyword. In addition, the user 201 can set one or more content documents to be associated with a customized action keyword. So, at a subsequent time, a user searching for a customized keyword will receive the one or more documents associated with the customized action keyword.

In some instances, the user 201 can customize an intent of a request corresponding to the customized keywords. Although not explicitly illustrated in interface 300, the user 201 can use the interface 300 to customize an intent of the request. For example, the user can customize the intent of each of the keywords found in column 304 corresponding to "Request Time Off", "Update Time Off," "View my time off," "Request Sick Leave," and "Request Vacation." Additionally, the user 201 can customize the intent of the search keywords and the corresponding customized action keywords.

In some instances, the user 201 can select which action keyword they want to customize. For example, as illustrated in screen 302, the user 201 can select from options 305 that include "Manage Time Off Calendars, "Manage Time Off Structures," and "Request Time Off." If the user adds a new customized action keyword, as shown in row 312, the options 305 will include the current action keywords and the new customized action keyword. Additionally, the action database 234 will be updated with the new customized action keyword and corresponding search keywords.

Figure 4A:
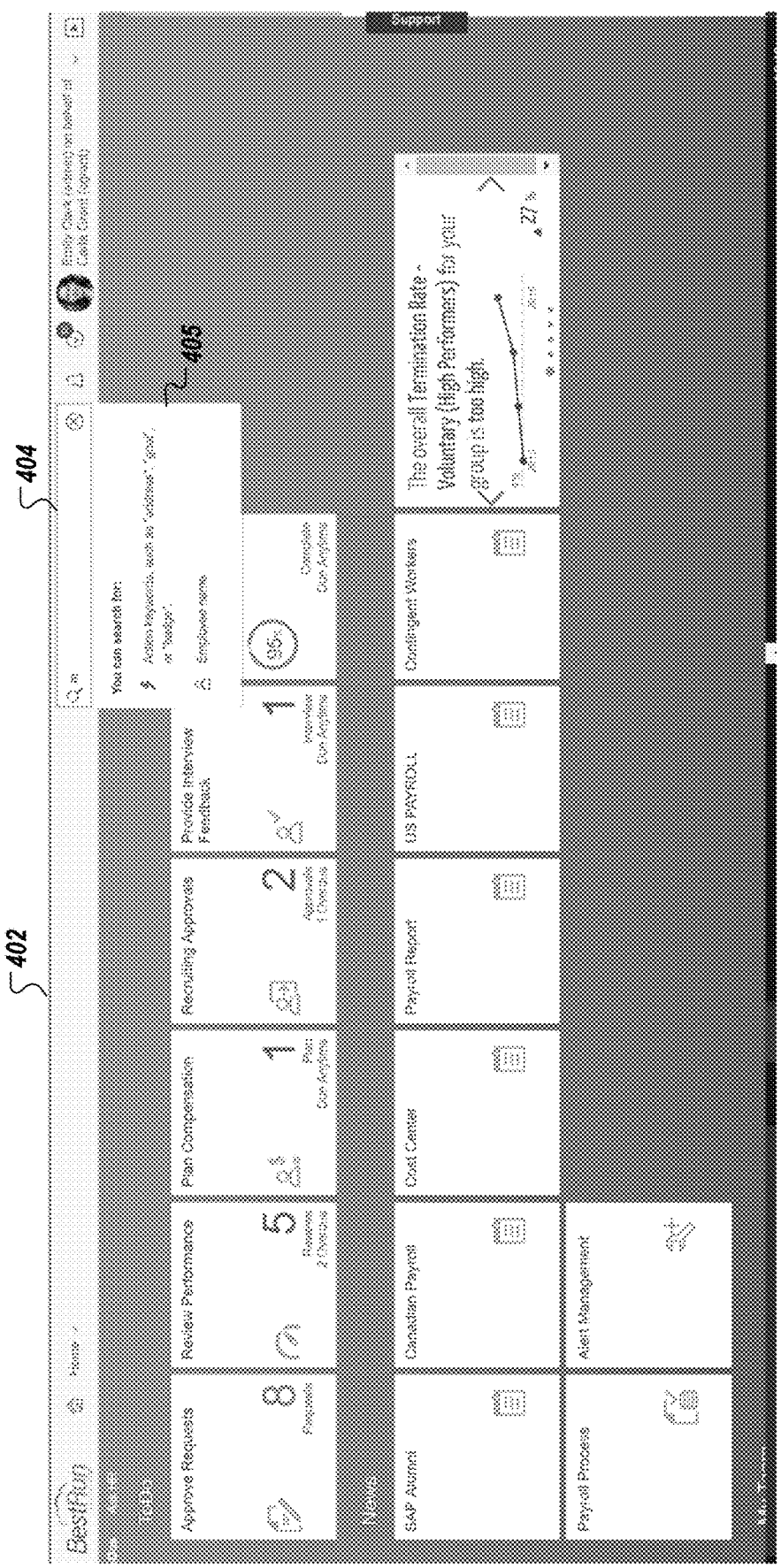

FIG. 4A is an example screenshot from an implementation of an interface 400 for providing a search request and received search results that utilize various data types. The interface 400 includes a screen 402 and a search entry bar 404. In the search entry bar 404, the user 201 can input one or more search keywords requesting for content documents. Additionally, the user can input one or more action keywords requesting for content documents. Upon the backend query module 208 determining a matching action keyword from the requested input, the search entry bar 404 can display the matching action keyword in the area 405 below the search entry bar 404. In particular, in response to the keyword action engine 214 determining a matching action keyword from the requested input, the keyword action engine 214 can transmit the matching action keyword to the client device 202 to display in the search entry bar 404 while the content engine 216 continues to search for content documents in the content database 236. This allows the user 201 to view what the content engine 216 is using to search for content documents.

Figure 4B:
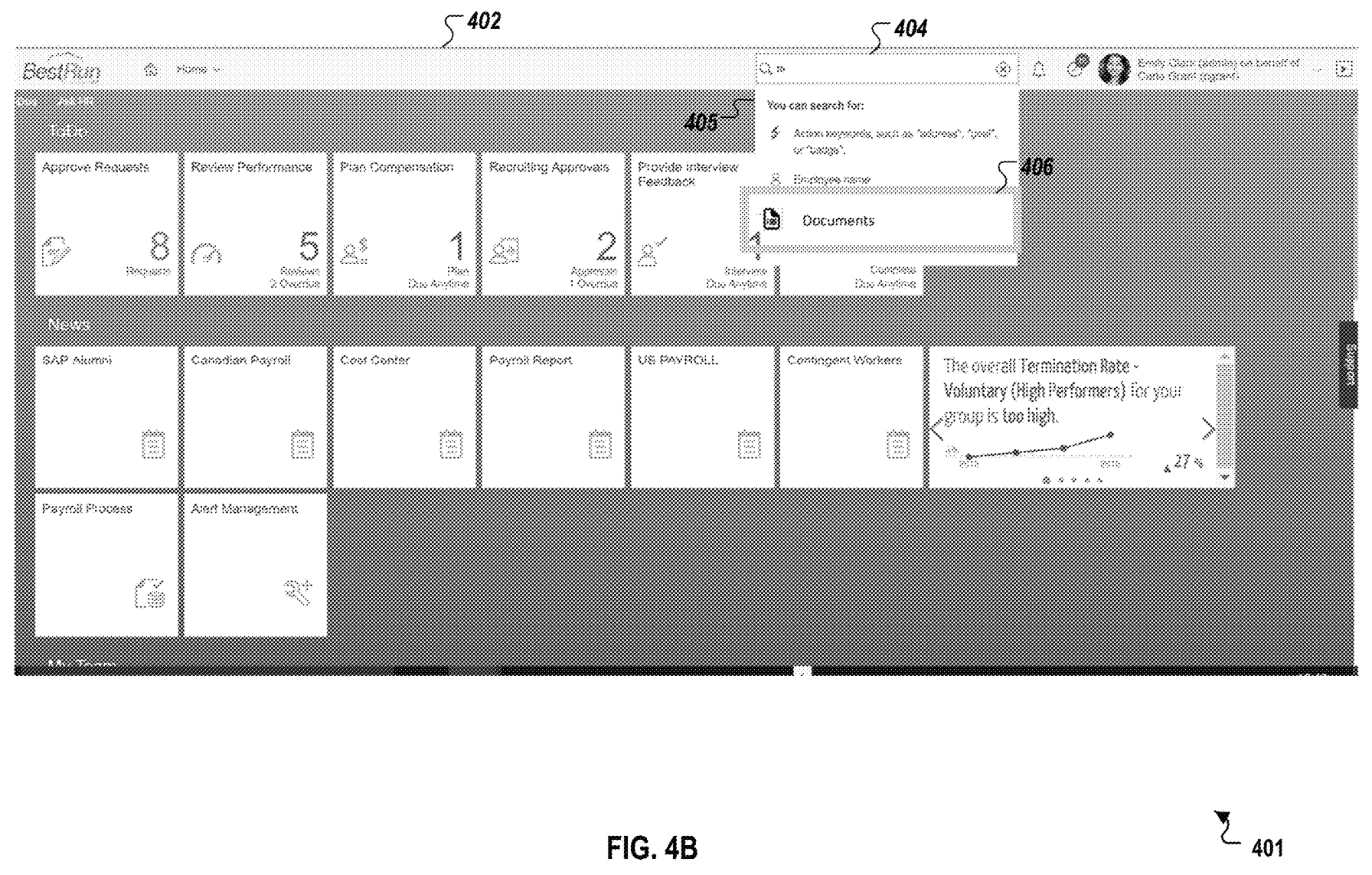

FIG. 4B is an example screenshot from an implementation of an interface 401 for providing a search request and received search results that utilize various data types. Interface 401 includes similar components to interface 400. The interface 401 includes a screen 402, a search entry bar 404, and an area 405 to display the search results. In particular, the area 405 includes content documents 406 to illustrate the results of the letter "m" entered into the search entry bar 404. The content documents 406 may be retrieved from an action keyword that corresponds to a search keyword that starts with a letter "m." The user can select the content documents 406 to view a list of the content documents provided by the content engine 218.

In some instances, as the user 201 is typing in the request, the client device 202 can send a notification to the backend query module 208 indicating that the user 201 is entering in the request to try and predict a content document that a user is likely to want to view. For example, the backend query module 208 can provide one or more content documents that the user has previously viewed in response to receiving the notification. In particular, the one or more content documents can be historical selections of content documents or even content documents that the user has previously received but not selected. These documents can remain in the search entry bar 404 even after the backend query module 208 determines one or more content documents from an identified action keyword or keywords and provides those one or more content documents to the client device 202.

Figure 4C:
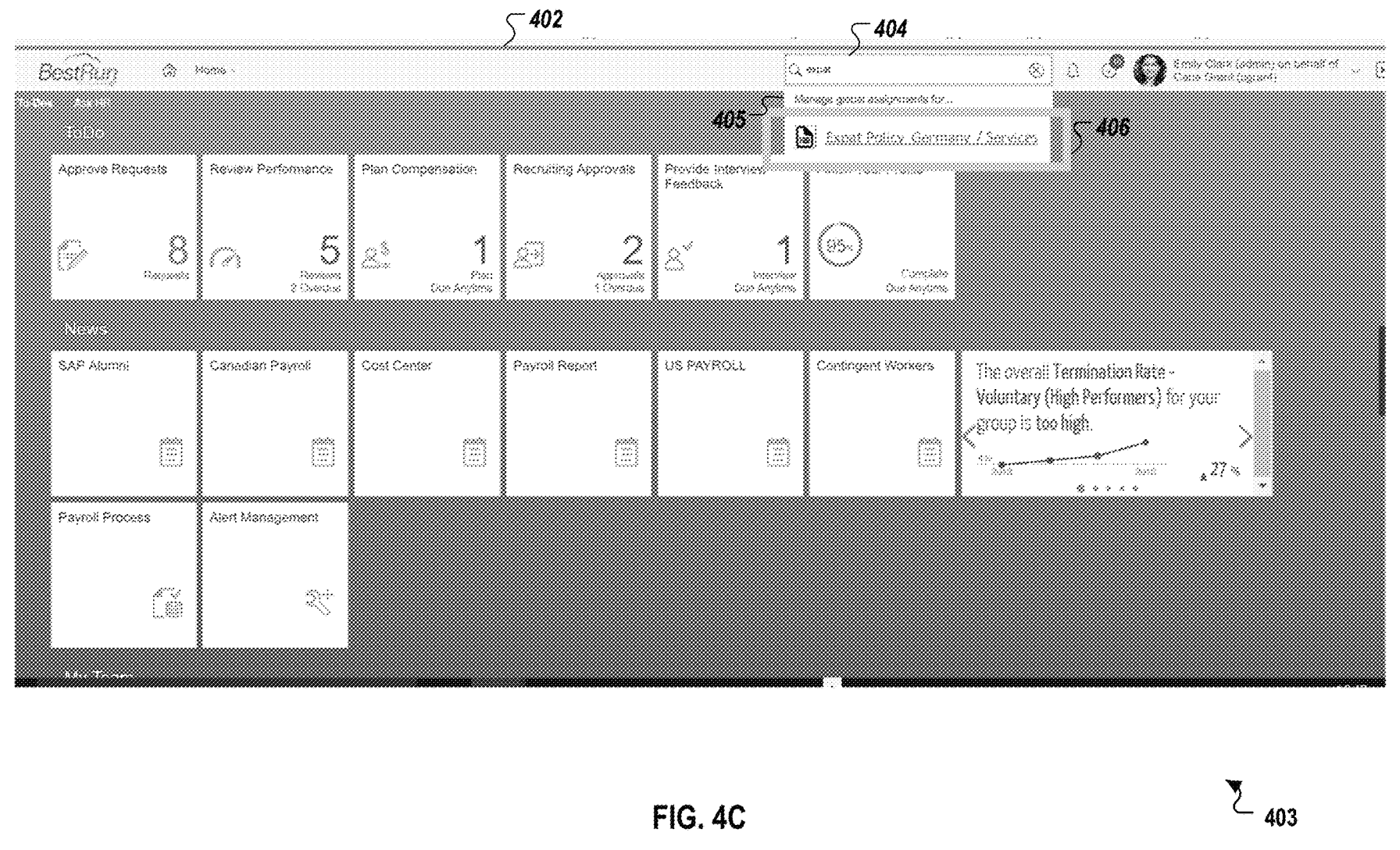

FIG. 4C is an example screenshot from an implementation of an interface 403 for providing a search request and received search results that utilize various data types. Interface 403 includes similar components to interfaces 401 and 400. In interface 403, the user 201 enters in "expat" into the search entry bar 404. The area 405 includes "Expat Policy Germany/Services" content documents 406. The user 201 can select the "Expat Policy Germany/Services" content documents 406 to view the list of the corresponding content documents.

Figure 5:
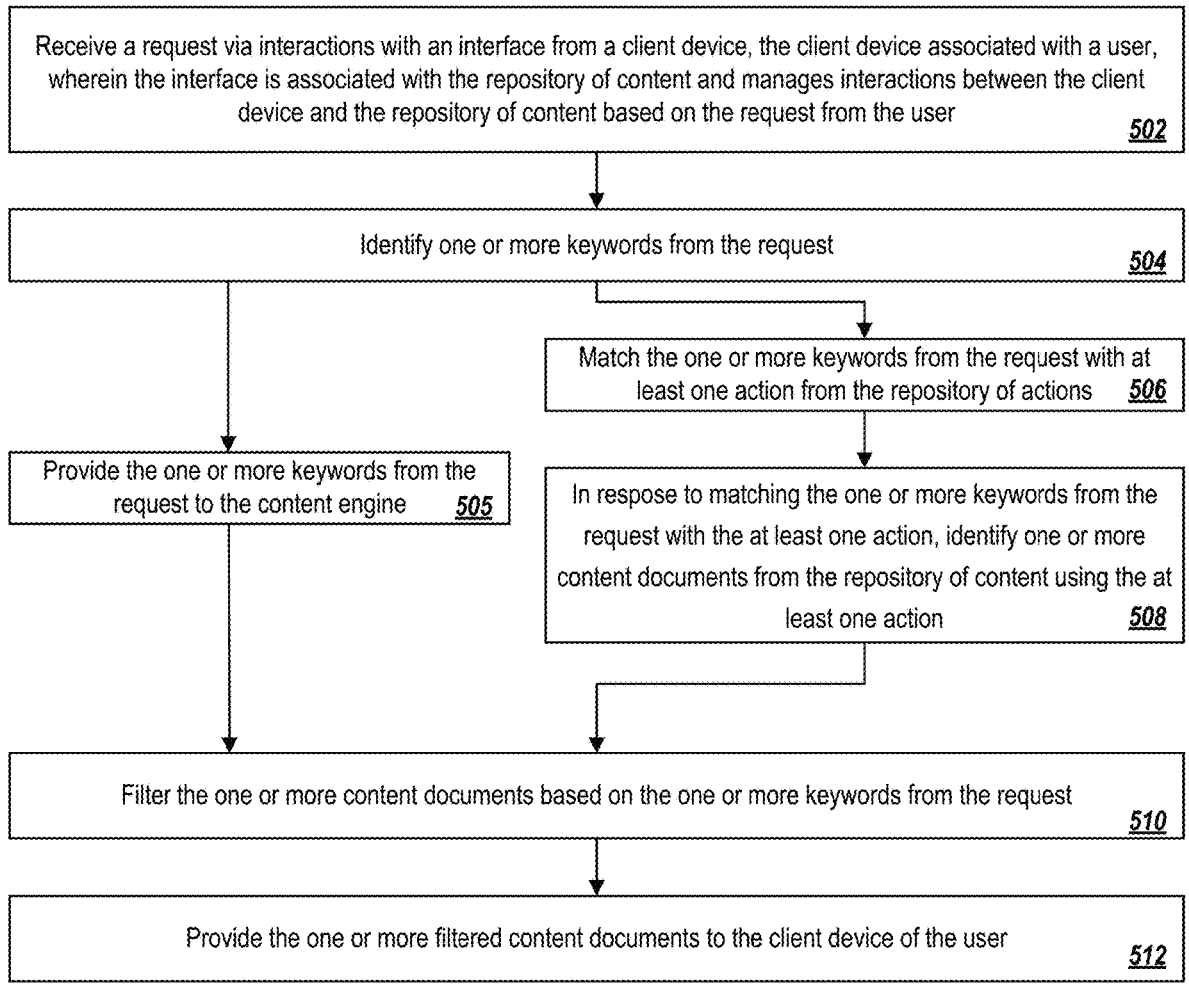
FIG. 5 is a flowchart of an example method performed by a backend server in connection with a client device for managing various data types to provide in search results in response to a request from a user.

FIG. 5 is a flowchart of an example method 500 performed by a backend server in connection with a client device for managing various data types to provide in search results in response to a request from a user. It will be understand that method 500 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 500. In some implementations, the method 500 and related methods are executed by one or more components of the system 100 described above with respect to FIG. 1, or the components described in FIGS. 2 and 3.

At 502, a request is received via interactions with an interface from a client device, the client device associated with a user, wherein the interface is associated with the repository of content and manages interactions between the client device and the repository of content based on the request from the user. In some instances, the request can include the content of the input (e.g., one or more search keywords, the identification of a particular user that transmitted the request, data identifying the client device that transmitted the request, and/or a user profile associated with the input). In some instances, the request may be received at a specific endpoint associated with a particular interface or related application such that the analysis of the request is based on the use of the particular interface or related application. Examples may include a digital assistant or a particular website, where the request is to be responded to be based on the information obtainable by or related to that particular interface or application.

In some instances, the request can include or can be text-based input, auditory input (e.g., an audio file), and/or video or image input. The request can be submitted by a user or agent associated with a particular user profile, although for purposes of some implementations of method 500, identification of the particular user profile is not required. Additionally, the request can include authentication and/or token data to authenticate the client device of the user. In some instances, the received request can represent a particular query, question, or interactive communication.

At 504, one or more keywords are identified from the request. In some instances, a natural language processing (NLP) engine may first be used to understand the intent, which is what the user input desires, is asking about, or otherwise relates to. A contextual engine can also identify one or more keywords from the user input 204. For example, if the user input includes the phrase "requesting time off PTO for holiday," the contextual engine may retrieve keywords such as "requesting," "time," "off," "PTO," "for," and "holiday."

At 506, the one or more keywords from the request are matched with at least one action from the repository of actions. In particular, the keyword action engine can use the one or more keywords and the intent of the request to identify at least one action keyword from an action database. The action keywords can correspond to actions that a person can take in an organizational, residential, or professional environment. For example, the action words can include "Request Time Off," "Update work hours," "View time off," "Request sick leave," "Request vacation time," and "Apply for a promotion." The keyword action engine can use the one or more keywords and the intent determined from the user input to determine one or more action keywords. For example, the keyword action engine can perform word matching between the one or more keywords found in the user input to one or more keywords found in the action database. The one or more keywords found in the action database can correspond to a particular action keyword. Additionally, the keyword action engine can use the intent determined from the user input to determine one or more matching words. By using the intent determination, the keyword action engine can minimize the amount of action keywords to search over in the action database and as a result, speed up the searching process.

At 508, in response to matching the one or more keywords from the request with the at least one action, one or more content documents from the repository of content are identified using the at least one action. In particular, the content engine can search the content database using the one or more action keywords as an index and retrieve the one or more content documents corresponding to the index. For example, the content engine can retrieve one or more content documents that fall under the action keywords of "Request Expat Info." The content documents can include, for example, "Document G for sign up information," "Document H for Expat Locations," and "Document I for expat travel arrangements."

In some instances, after and/or in addition to the contextual engine identifying one or more keywords from the request, the contextual engine can provide one or more keywords to the content engine, as illustrated by 505. The content engine can use the one or more keywords in filtering the content documents. In some instances, the contextual engine can transmit the one or more keywords to the content engine. In other instances, the contextual engine can store the one or more keywords in the person database, the action database, and/or the content database, and transmit an indication to the content engine 218 to retrieve the one or more keywords.

At 510, the one or more content documents are filtered based on the one or more keywords from the request. In particular, the content engine can perform one or more additional actions, such as filtering, on the content documents based on the one or more keywords from the request. For example, continuing with Documents G, H, and I, the content engine can compare each of these document's title, content, and metadata with the keywords "expat," "travel", and "location" from the request. The content engine may perform keyword matching between the keywords found in the request with keywords in the document's title, the content of the document, or the metadata of the document. In this example, comparing the keywords "expat," "travel," and "location" returns Document H and Document I, without Document G, considering Document G does not have any of the keywords from the request in found in Document G's title, content, or metadata.

At 512, the one or more filtered content documents are provided to the client device of the user. For instance, the content engine can package the filtered content documents and can transmit the package of content documents, a hyperlink of the content documents, a location in memory of the saved package of content documents, or the content documents themselves. The user can review the filtered content documents on his or her client device.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
receiving a request via interactions with an interface from a client device, the client device associated with a user, wherein the interface is associated with a repository of content and manages interactions between the client device and the repository of content based on the request from the user;
identifying one or more keywords from the request;
matching the one or more keywords from the request with at least one action from a repository of actions, wherein the at least one action is an action that can be performed by the user within an organization;
in response to matching the one or more keywords from the request with the at least one action, identifying one or more content documents from the repository of content associated with the at least one action, wherein the one or more content documents are identified using a trained machine learning model, and wherein the machine learning model was trained using:
the at least one action from the repository of actions;
one or more content documents of the repository of content;
previous requests by the user; and
previous selections by the user corresponding to the one or more content documents;
filtering the one or more identified content documents based on the one or more keywords from the request; and
providing the one or more filtered content documents to the client device of the user in response to the received request.

2. The method of claim 1, further comprising:
providing the request and data identifying the user that transmitted the request to the trained machine learning model, wherein, for each of the one or more content documents, the trained machine learning module generates a predicted likelihood that a user will select a particular content document;
determining a subset of the one or more content documents, wherein each of the one or more content documents in the subset is associated with a corresponding predicted likelihood greater than a predetermined threshold; and
providing the subset of the content documents to the client device.

3. The method of claim 1, further comprising:
determining an authentication of the user corresponding to the client device;
comparing credentials of the user to one or more stored credentials;
in response to determining the credentials of the user match the one or more stored credentials, generating an authentication credential for an authenticated user corresponding to the client device; and
providing the authentication credential to the client device for the authenticated user to transmit the request to the interface.

4. The method of claim 1, wherein matching the one or more keywords from the request with at least one action from the repository of actions further comprises:
determining master data that corresponds to the user comprising at least one of locational data of the user, organizational data of the user, and employee class data of the user, wherein the master data is stored at a backend system associated with the content repository; and
applying the master data and the one or more keywords to match with the at least one action from the repository of actions.

5. The method of claim 1, further comprising:
receiving a selection of a filtered content document from the one or more filtered content documents that were provided to the client device; and
providing at least one of a link and an interactive viewing of the selected content document to the client device.

6. The method of claim 1, further comprising:
receiving an indication that a user is entering the request in the client device;
based on the indication and while the user is entering the request, predicting a content document that a user is likely to select based on historical selections of content documents by the user; and
providing the predicted content document to the client device.

7. The method of claim 1, wherein identifying one or more content documents from the repository of content associated with the at least one action comprises:
providing the at least one action to the client device to display to the user while identifying the one or more content documents from the repository of content using the at least one action.

8. The method of claim 1, wherein in response to identifying the one or more keywords from the request:
providing the one or more keywords to a content engine to filter the one or more identified content documents based on the one or more keywords from the request.

9. The method of claim 1, wherein the at least one action that can be performed by the user within an organization is a human resources request.

10. A non-transitory, computer-readable medium storing computer-readable instructions executable by a computer and configured to:
receiving a request via interactions with an interface from a client device, the client device associated with a user, wherein the interface is associated with a repository of content and manages interactions between the client device and the repository of content based on the request from the user;
identifying one or more keywords from the request;
matching the one or more keywords from the request with at least one action from a repository of actions, wherein the at least one action is an action that can be performed by the user within an organization;
in response to matching the one or more keywords from the request with the at least one action, identifying one or more content documents from the repository of content associated with the at least one action, wherein the one or more content documents are identified using a trained machine learning model, and wherein the machine learning model was trained using:
the at least one action from the repository of actions;
one or more content documents of the repository of content;
previous requests by the user; and
previous selections by the user corresponding to the one or more content documents;
filtering the one or more identified content documents based on the one or more keywords from the request; and
providing the one or more filtered content documents to the client device of the user in response to the received request.

11. The non-transitory, computer-readable medium of claim 10, further comprising:
providing the request and data identifying the user that transmitted the request to the trained machine learning model, wherein, for each of the one or more content documents, the trained machine learning module generates a predicted likelihood that a user will select a particular content document;
determining a subset of the one or more content documents, wherein each of the one or more content documents in the subset is associated with a corresponding predicted likelihood greater than a predetermined threshold; and
providing the subset of the content documents to the client device.

12. The non-transitory, computer-readable medium of claim 10, further comprising:
determining an authentication of the user corresponding to the client device;
comparing credentials of the user to one or more stored credentials;
in response to determining the credentials of the user match the one or more stored credentials, generating an authentication credential for an authenticated user corresponding to the client device; and
providing the authentication credential to the client device for the authenticated user to transmit the request to the interface.

13. The non-transitory, computer-readable medium of claim 10, wherein matching the one or more keywords from the request with at least one action from the repository of actions further comprises:
determining master data that corresponds to the user comprising at least one of locational data of the user, organizational data of the user, and employee class data of the user, wherein the master data is stored at a backend system associated with the content repository; and
applying the master data and the one or more keywords to match with the at least one action from the repository of actions.

14. The non-transitory, computer-readable medium of claim 10, further comprising:
receiving a selection of a filtered content document from the one or more filtered content documents that were provided to the client device; and
providing at least one of a link and an interactive viewing of the selected content document to the client device.

15. The non-transitory, computer-readable medium of claim 10, further comprising:
receiving an indication that a user is entering the request in the client device;
based on the indication and while the user is entering the request, predicting a content document that a user is likely to select based on historical selections of content documents by the user; and
providing the predicted content document to the client device.

16. The non-transitory, computer-readable medium of claim 10, wherein identifying one or more content documents from the repository of content associated with the at least one action comprises:
providing the at least one action to the client device to display to the user while identifying the one or more content documents from the repository of content using the at least one action.

17. The non-transitory, computer-readable medium of claim 10, wherein in response to identifying the one or more keywords from the request:

providing the one or more keywords to a content engine to filter the one or more identified content documents based on the one or more keywords from the request.

18. A system, comprising:
    at least one processor; and
    a memory communicatively coupled to the at least one processor, the memory storing instructions which, when executed by the at least one processor, cause the at least one processor to perform operations comprising:
       receiving a request via interactions with an interface from a client device, the client device associated with a user, wherein the interface is associated with a repository of content and manages interactions between the client device and the repository of content based on the request from the user;
       identifying one or more keywords from the request;
       matching the one or more keywords from the request with at least one action from a repository of actions, wherein the at least one action is an action that can be performed by the user within an organization;
       in response to matching the one or more keywords from the request with the at least one action, identifying one or more content documents from the repository of content associated with the at least one action, wherein the one or more content documents are identified using a trained machine learning model, and wherein the machine learning model was trained using:
          the at least one action from the repository of actions;
          one or more content documents of the repository of content;
          previous requests by the user; and
          previous selections by the user corresponding to the one or more content documents;
       filtering the one or more identified content documents based on the one or more keywords from the request; and
    providing the one or more filtered content documents to the client device of the user in response to the received request.

* * * * *